(12) United States Patent
Arage

(10) Patent No.: US 9,310,468 B2
(45) Date of Patent: Apr. 12, 2016

(54) RADAR SYSTEM WITH IMPROVED MULTI-TARGET DISCRIMINATION

(71) Applicant: DELPHI TECHNOLOGIES, INC., Troy, MI (US)

(72) Inventor: Alebel Hassen Arage, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 56 days.

(21) Appl. No.: 14/277,894

(22) Filed: May 15, 2014

(65) Prior Publication Data

US 2015/0331086 A1    Nov. 19, 2015

(51) Int. Cl.
| | |
|---|---|
| *G01S 7/292* | (2006.01) |
| *G01S 13/02* | (2006.01) |
| *G01S 7/02* | (2006.01) |
| *G01S 13/42* | (2006.01) |
| *G01S 13/58* | (2006.01) |
| G01S 7/00 | (2006.01) |
| G01S 13/00 | (2006.01) |

(Continued)

(52) U.S. Cl.
CPC .............. *G01S 7/02* (2013.01); *G01S 7/2926* (2013.01); *G01S 13/02* (2013.01); *G01S 13/42* (2013.01); *G01S 13/582* (2013.01); *G01S 13/4463* (2013.01); *G01S 13/931* (2013.01)

(58) Field of Classification Search
CPC ............ G01S 7/02; G01S 7/28; G01S 7/285; G01S 7/292; G01S 7/2923; G01S 7/2926; G01S 13/02; G01S 13/06; G01S 13/42; G01S 13/44; G01S 13/4463; G01S 13/50; G01S 13/58; G01S 13/581; G01S 13/582; G01S 13/88; G01S 13/93; G01S 13/931; G01S 13/003; G01S 13/66; G01S 13/72; G01S 13/723; G01S 13/726; G01S 3/78; G01S 3/782; G01S 3/785; G01S 3/786; G01S 3/7864; G07C 9/00
USPC .......... 342/27, 28, 59, 70–74, 81, 82, 89–103, 342/175, 192–197
See application file for complete search history.

(56) References Cited

U.S. PATENT DOCUMENTS

| | | | | |
|---|---|---|---|---|
| 4,112,419 A | * | 9/1978 | Kinoshita | G07C 9/00 342/27 |
| 4,470,048 A | * | 9/1984 | Short, III | G01S 13/02 342/192 |
| 4,916,452 A | | 4/1990 | Borchert et al. | |

(Continued)

FOREIGN PATENT DOCUMENTS

| | | |
|---|---|---|
| DE | 10 2013 205530 A1 | 10/2013 |
| EP | 1 548 458 A2 | 6/2005 |

*Primary Examiner* — Bernarr Gregory
(74) *Attorney, Agent, or Firm* — Lawrence D Hazelton

(57) ABSTRACT

A includes a plurality of antennas and a controller. Each antenna is configured to detect a reflected radar signal reflected by an object in a field-of-view of the system. The controller is configured to receive an antenna signal from each antenna corresponding to the reflected radar signal detected by the antenna. The controller is also configured to determine a reflected signal profile of each antenna signal. The controller is also configured to determine a composite data set based on a combination of the reflected signal profiles. The controller is also configured to determine if the composite data set includes a composite data point characterized as greater than a composite threshold. The controller is also configured to determine if any of the reflected signal profiles indicate that the radar signal is reflected by more than one object.

12 Claims, 4 Drawing Sheets

(51) Int. Cl.
  *G01S 13/93* (2006.01)
  *G01S 13/44* (2006.01)

(56) References Cited

U.S. PATENT DOCUMENTS

| | | | |
|---|---|---|---|
| 5,162,802 A * | 11/1992 | Zuniga | G01S 13/726 342/96 |
| 5,594,451 A | 1/1997 | Krikorian et al. | |
| 5,798,942 A * | 8/1998 | Danchick | G01S 3/7864 342/90 |
| 6,018,311 A | 1/2000 | David | |
| 6,087,974 A * | 7/2000 | Yu | G01S 13/44 342/195 |
| 6,498,581 B1 * | 12/2002 | Yu | G01S 13/4463 342/195 |
| 6,538,599 B1 | 3/2003 | David | |
| 7,199,750 B2 * | 4/2007 | Bourdelais | G01S 13/003 342/195 |
| 7,474,262 B2 | 1/2009 | Alland | |
| 7,639,171 B2 | 12/2009 | Alland et al. | |
| 8,730,092 B2 * | 5/2014 | Jaffer | G01S 13/003 342/175 |
| 2002/0135517 A1 | 9/2002 | Yu et al. | |
| 2010/0075618 A1 | 3/2010 | Isaji | |
| 2013/0257642 A1 | 10/2013 | Kawabe et al. | |

* cited by examiner

RADAR SYSTEM WITH IMPROVED MULTI-TARGET DISCRIMINATION

TECHNICAL FIELD OF INVENTION

This disclosure generally relates to a radar system, and more particularly relates to a system that compares a composite signal based on a combination of signals from a plurality of receive antenna to the individual signals from each receive antenna for detecting multiple objects or targets.

BACKGROUND OF INVENTION

Because of antenna size, system size, technology, and cost constraints, automotive radar sensors may have performance limitations with regard to discriminating two targets that have similar position and Doppler shift reflection characteristics, or if one target has a substantially larger Radar Cross Section (RCS) than a second nearby target. Examples where two targets have similar range and Doppler shift reflection characteristics so that typical automotive radar systems have difficulty discerning the two targets include: a slowly moving pedestrian walking around stationary or slowly moving passenger vehicle, a motor cycle traveling beside a truck-trailer traveling in adjacent lane at a similar range and range rate, and two passenger cars moving close to each other on adjacent lanes at longer range with similar range rates.

SUMMARY OF THE INVENTION

In accordance with one embodiment, a radar system is provided. The system includes a plurality of antennas and a controller. Each antenna is configured to detect a reflected radar signal reflected by an object in a field-of-view of the system. The controller is configured to receive an antenna signal from each antenna corresponding to the reflected radar signal detected by the antenna. The controller is also configured to determine a reflected signal profile of each antenna signal. The controller is also configured to determine a composite data set based on a combination of the reflected signal profiles. The controller is also configured to determine if the composite data set includes a composite data point characterized as greater than a composite threshold. The controller is also configured to determine if any of the reflected signal profiles indicate that the radar signal is reflected by more than one object.

In another embodiment, a method of operating radar system is provided. The method includes the step of receiving an antenna signal from each of a plurality of antenna corresponding to a reflected radar signal detected by each antenna. The method also includes the step of determining a reflected signal profile of each antenna signal. The method also includes the step of determining a composite data set based on a combination of the reflected signal profiles. The method also includes the step of determining if the composite data set includes a composite data point characterized as greater than a composite threshold. The method also includes the step of determining if any of the reflected signal profiles indicate that the radar signal is reflected by more than one object.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
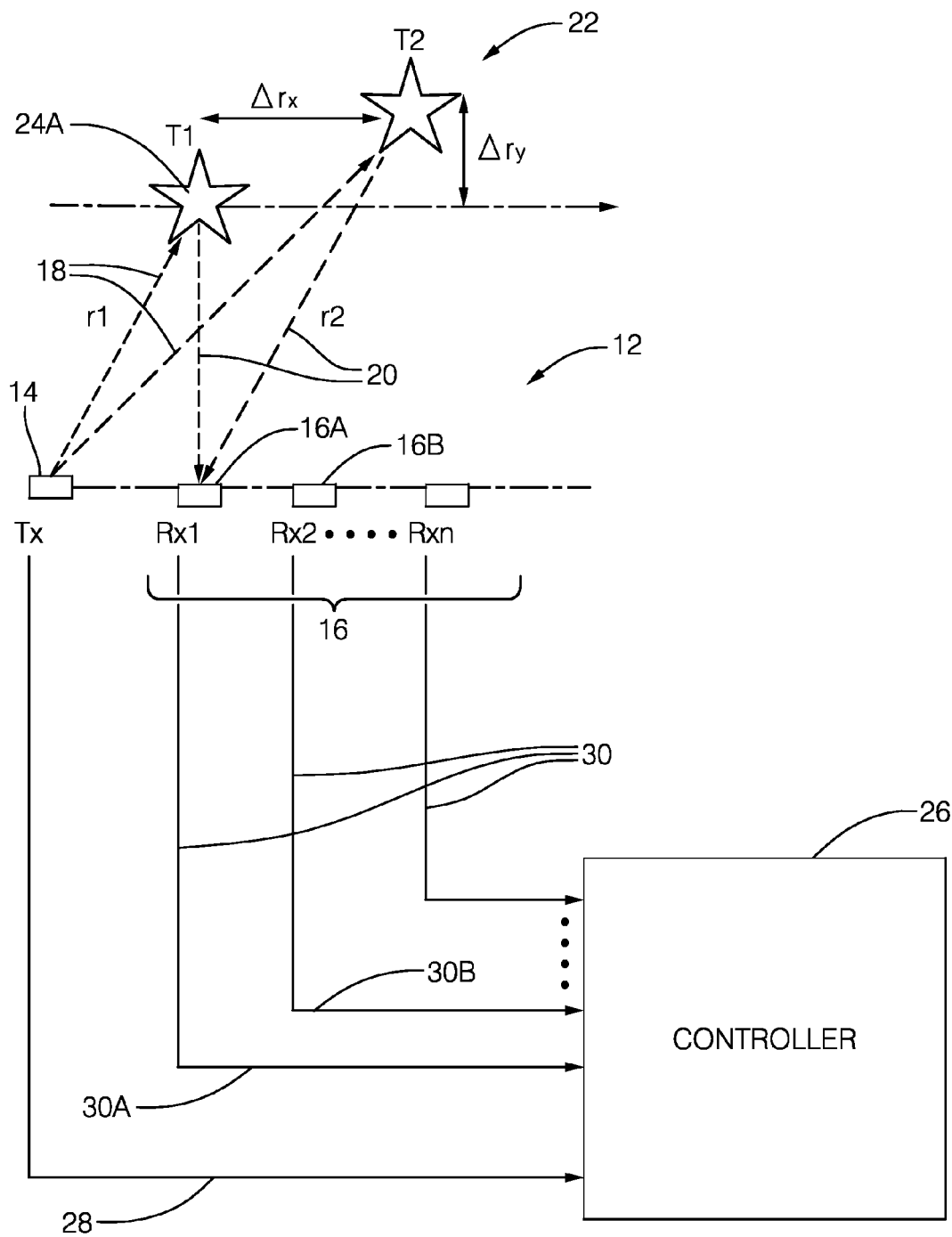
FIG. 1 is a diagram of a radar system in accordance with one embodiment.

FIG. 1 illustrates a non-limiting example of a radar system, hereafter referred to as the system 10. The system 10 includes an antenna array 12 that may include a transmit-element 14, and an array of receive elements, hereafter referred to as a plurality of antennas 16. It is recognized that one or more of the antenna elements that make up the antenna array 12 could be used to both transmit a radar signal 18, and detect reflected radar signals 20 reflected by a first object 24A or a second object 24B in a field-of-view 22 of the system 10. The transmit-element 14 and the plurality of antennas 16 are illustrated as distinct elements only to simplify the explanation of the system 10.

The system 10 may also include a controller 26 configured output a transmit-signal 28 to the transmit-element 14, and configured to receive antenna signals 30 from each antenna, for example a first signal 30A from a first antenna 16A and a second signal 30B from a second antenna 16B. Each of the antenna signals 30 is characterized as corresponding to the reflected radar signals 20 detected by each of the plurality of antennas 16. The controller 26 may include a processor (not shown) such as a microprocessor, digital signal processor, or other control/signal conditioning circuitry such as analog and/or digital control circuitry including an application specific integrated circuit (ASIC) for processing data, as should be evident to those in the art. The controller 26 may include memory, including non-volatile memory, such as electrically erasable programmable read-only memory (EEPROM) for storing one or more routines, thresholds and captured data. The one or more routines may be executed by the processor to perform steps for determining if the antenna signals 30 received by the controller 26 indicate the presence of the first object 24A or the second object 24B, as described herein.

To meet customer specified angular-resolution requirements of automotive radar systems, such systems often use antennas that have relatively narrow transmit and receive beam-widths to scan a field-of-view for objects. In this non-limiting example, the transmit-element 14 radiates or emits the emitted radar signal 18 toward the first object 24A or the second object 24B in a field-of-view 22, and the plurality of antennas 16 detects a reflected radar signal reflected by the first object 24A and the second object 24B in the field-of-view 22 of the system 10. Characteristics of the reflected radar signals 20 depend on a backscatter property or radar cross section (RCS) of the first object 24A or the second object 24B. The characteristics also depend on distance, direction, and relative motion of the first object 24A and/or the second object 24B relative to the antenna array 12, which influences the Doppler shift of the reflected radar signals 20. Depending on the signal waveform and the modulation system used, the controller 26 may transform the time domain signals (the antenna signals 30) to the frequency domain so the spectrums can be combined using, for example, non-coherent integration (NCI). Some automotive radar systems use this non-coherently integrated spectral data as the basis for object detection, and evaluate the spectral data to determine the position and Doppler parameter estimates that have higher spectral magnitude than a defined detection threshold. NCI is generally preferred to suppress noise induced variation and thereby keep noise induced false alarm rates to a minimum.

If multiple objects are present in the field-of-view 22, the reflected radar signals 20 may interfere with each other depending on the relative position and/or range rate difference between the objects with respect to the receive antennas (the plurality of antennas 16). A relative position difference between the first object 24A and the second object 24B is illustrated as Δrx and Δry and may be exhibited in terms of a relative phase difference between the reflected radar signals 20 from these scattering centers. That may cause the antenna signals 30 to exhibit dissimilar interference characteristics for the signals from the scattering centers of the objects due to the fact that the relative phase difference changes across the plurality of antennas 16. This leads to different range-Doppler spectral profiles across the plurality of antennas 16, and increases the probability to get instantaneous multiple spectral peaks and nulls if the detection strategy is based on an 'or-logic' comparison of the single-channel or individual signals. Depending on the number of elements in the plurality of antennas 16, this detection concept improves detection and discrimination of nearby scattering centers. By contrast, NCI based detection suppresses the position difference effect of scattering centers by averaging out the spectrum difference across the antenna signals 30, which makes nearby scattering center resolution and discrimination more difficult.

Accordingly, the system 10 described herein applies a composite detection strategy based on NCI spectrum together with a single receive channel spectrum analysis using 'or logic' in order to improve automotive radar range, range rate, and angle measurement resolution, and enhance system performance for near targets discrimination, target imaging, and lateral range rate estimation. A time delay between transmitted and received signals as well as the frequency shift due to Doppler effect is used to compute radial distance (e.g. r1 or r2 in FIG. 1) and relative velocity of a detected object, e.g. the first object 24A or the second object 24B. The received signal-phase differences the antenna signals 30 are used to estimate the angle (direction) of a detected object by applying various angle finding techniques algorithms such as Monopulse, digital beam forming, or super-resolution.

Object detection by the system 10 may be first done in the Range-Doppler (RD) domain after applying a 2D-FFT algorithm to the antenna signals 30, and then integrating the resulting range-Doppler spectrums non-coherently. Local maxima of the resultant NCI RD-image and their immediate adjacent neighboring spectrums are used and processed to detect object and determine its corresponding RD-coordinates including lateral and longitudinal position of the object after applying the desired angle finding algorithm on the detection raw spectral data.

In certain situations, multiple objects could have nearly the same range and Doppler parameters. The range and Doppler differences between these objects can be smaller than RD-measurement resolution, which is mainly predetermined from signal waveform parameters like sweeping frequency and dwell time. As result, these objects can appear as one local maxima of the NCI RD-image, and their discrimination will only depend on angle if they possess lateral span that is consistent with measurement resolution of the applied angle finding technique (i.e. antenna pattern beam width, configuration, and angle evaluation algorithm). That means, for relatively nearby targets with inadequate Doppler, longitudinal, and lateral separations, the performance of multiple targets discrimination is limited for NCI only RD-image based detection strategy.

For a specific radar system design, such a limitation in resolution and discrimination performance can be improved significantly if the detections strategy evaluates not only a composite NCI RD-image, but also each of the antenna signals on an individual basis, i.e. single receive channel RD-images. As described above, signals from two nearby scattering centers of an object or objects may interfere at the receive antenna element depending on signals relative phase difference between these scattering centers. This relative phase difference is a function of the lateral and longitudinal range separation (e.g. Δrx, Δry) between these two scattering centers, and may not be equal across the plurality of antennas 16. This is especially true for automotive radar that operates at millimeter wave, 3.92 mm for example, which is much smaller than in the real world expected position difference between scattering centers. As a result, spectrums of the signals interference from these scattering centers should possess dissimilar profile between receive antenna-array elements, and show peaks and nulls at different range and Doppler frequencies for different antenna-array elements. This implies that single receive antenna element (or channel) detection strategy with an 'or-logic' is more sensitive to discriminate scattering centers in range with higher resolution than NCI based detections. NCI will significantly suppress the effect of variation in relative phase difference across receive antenna-array elements on interfered signal spectrum, and thereby degrade second scattering center detection and discrimination. In cases where multiple signal peaks are not detected in one of the plurality of antennas 16, local spectral broadening will be seen as result of uniform constructive signal interference across all of the plurality of antennas 16.

Applying the dual detection approach described herein by screening both NCI and single channel spectral peaks, as well as by evaluating NCI spectral broadening increases range, Doppler shift, and angle resolution performance of automotive radar sensors without need for radar system design change. This enhances active safety features such as near target discrimination, automotive radar target imaging, and cross traffic detection as a result of improved lateral rate estimation. This technique is applicable in most forms of automotive radar sensor products, and implementation is straight forward with modest signal processing increase in memory and throughput.

The system 10 described herein may be used as part of an automated driving system that controls various aspects of the vehicle such as vehicle speed and/or automated braking. If a radar system installed in a host vehicle was unable to detect a nearby object such as a motorcycle directly forward of the host vehicle by discriminating the motorcycle from a larger, further away object detected by NCI, a semi-trailer in a travel lane adjacent the lane of the host vehicle, the speed control system may undesirably accelerate the host vehicle toward the motorcycle. That is, the larger signal reflected from the trailer may mask the smaller signal reflected from the motorcycle if they are near to each other in range and/or have similar range rates. In such cases, the NCI detects only one peak within a broad spectrum. Since the two objects are in adjacent lanes, the system 10 may not be able to discriminate the angle of one object from the angle of the other, especially at longer ranges due to limited angular resolution of the angle finding technique used. This is an example of why near target discrimination on the range profiles and/or Doppler profiles or range-Doppler images is advantageous to reliably track objects the host vehicle lane.

Referring again to FIG. 1, non-limiting example of the system 10 includes a plurality of antennas 16, and a controller 26. Each antenna (e.g. the first antenna 16A and the second antenna 16B) is configured to detect the reflected radar signal 20 reflected by an object (e.g. the first object 24A or the second object 24B) in the field-of-view 22 of the system 10. While the only reflected signals that are illustrated are directed to the first antenna 16A, it should be understood that all of the plurality of antennas 16 would typically receive reflected radar signals from all of the targets or objects in the field-of-view 22.

The controller 26 may be configured to receive an antenna signal (e.g. the first signal 30A and the second signal 30B) from each antenna (e.g. the first antenna 16A and the second antenna 16B) corresponding to the reflected radar signal 20 that was detected by each of the plurality of antennas 16. The controller 26 may include a mixer (not shown) and a local oscillator (not shown) in order to demodulate the antenna signals 30

Figure 2:
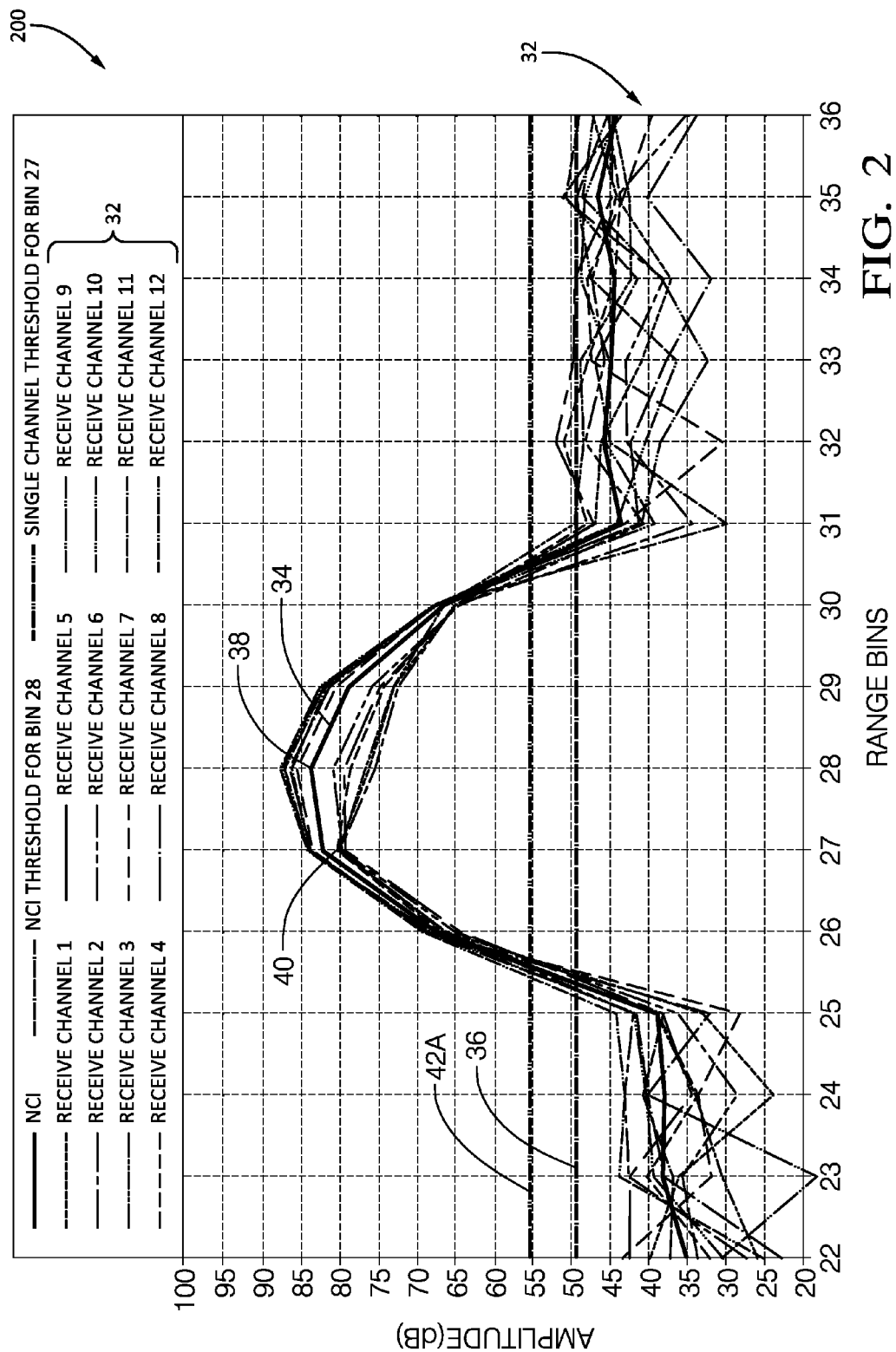
FIG. 2 is a graph of signal present in the system of FIG. 1 in accordance with one embodiment.
Figure 3:
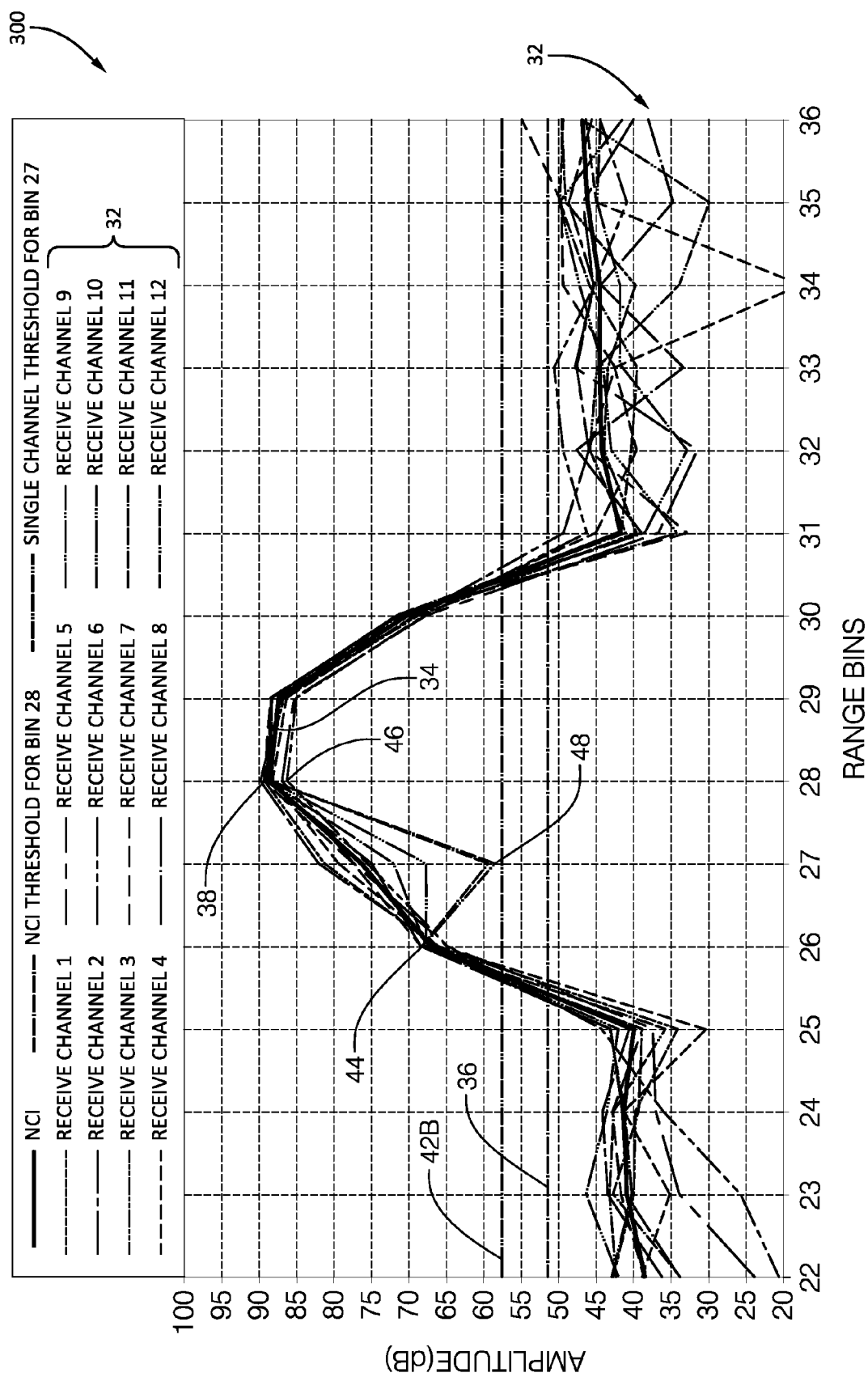
FIG. 3 is a graph of signal present in the system of FIG. 1 in accordance with one embodiment.

FIGS. 2 and 3 are non-limiting examples of graphs 200 and 300, respectively, which illustrate an example of near targets discrimination when using a single channel detection technique. That is, a reflected signal profile is determined for each of the antenna signals 30 for each of the plurality of antennas 16. In this non-limiting example the antenna array 12 has twelve receive antennas. In order to process the antenna signals 30 to provide this data, the controller 26 may also be configured to determine a reflected signal profile 32 (FIGS. 2 and 3) of each antenna signal (e.g. the first signal 30A and the second signal 30B). The reflected signal profiles 32 may be expressed in terms of signal amplitude versus range to the target as is the case for the graphs 200 and 300 illustrated in FIGS. 2 and 3, respectively. The x-axis of the graphs 200 and 300 are in digitized units of 'Range bins' where each range bin represents a range distance of about one-hundred-forty-four centimeters (1.44 m). Data corresponding to very short distances is ignored so that the twenty-eighth range bin (#28) corresponds to a distance from the antenna array 12 to the object being detected is about forty meters (40 m). Alternatively, the reflected signal profile may be expressed in terms of Doppler frequency bins instead of range bins, or a combination thereof, as will be recognized by those in the art.

The controller 26 may also be configured to determine a composite data set 34 based on a combination of the reflected signal profiles 32. By way of example and not limitation, the composite data set 34 may be determined by way of non-coherent integration (NCI) as will be recognized by those in the art. Alternatively, the composite data set 34 may be determined by way of coherent integration or complex averaging.

The presence of an object in the field-of-view 22 may be indicated by the amplitude of the composite date set 34. As such, the controller 26 may also be configured to determine if the composite data set 34 includes a composite data point characterized as greater than a composite threshold 36. A suitable threshold for the example system described herein is around fifty decibel (50 dB); the composite threshold may be dynamically adjusted based for various reasons such as a measure of background noise, the shape of the composite data set 34, or how much variation is present in the reflected signal profiles 32. The composite threshold 36 for any range bin of a particular system would typically be determined empirically and would vary with changes in configuration of the antenna array 12 and other factors in the controller.

As indicated above, it was discovered that in some instances the composite data set 34 may have a shape or contour that suggests only a single object is present when in fact there are two objects present in the field-of-view 22. Accordingly, it is advantageous to configure the controller to determine if any of the reflected signal profiles 32 indicate that the radar signal is reflected by more than one object. That is, by examining each of the reflected signal profiles 32 individually and/or comparing each of the reflected signal profiles 32 individually to the composite date set 34, as opposed to only examining the composite date set 34, is has been observed that the presence of more than one object can be detected or determined.

It is recognized that such an individual examination of each of the reflected signal profiles 32 may increase the amount of data processing performed by the controller to a point where other performance characteristics of the system 10 may be compromised. While simply selecting a controller with greater processing speed may solve this problem, doing so typically causes an undesirable increase in the cost of the controller. As an alternative to simply increasing the processing speed, the controller 26 may be advantageously configured to determine if any of the reflected signal profiles 32 indicate that the radar signal (the emitted radar signal 18) is reflected by more than one object only if, or only when the controller 26 determines that the composite data set 34 includes a composite data point greater than the composite threshold 36. That is, if the composite data set 34 does not provide some indication that an object (e.g. the first object 24A or the second object 24B) is present, then the reflected signal profiles 32 are not individually examined, so the controller 26 is available for other control or processing tasks.

FIG. 2 illustrates a non-limiting example of a graph 200 that illustrates the reflected signal profiles 32 and the composite data set 34 when two objects (e.g. the first object 24A and the second object 24B) are present in the field-of-view 22. In this example, the composite data set 34 defines or includes a peak composite point 38 in range bin #28 that is, or is characterized as greater than the composite threshold 36. As such, the composite data set 34 in this example suggests that at least one object or target is present in the field-of-view 22.

Further examination of reflected signal profiles 32 on an individual basis or single channel basis indicates that at least one of the reflected signal profiles 32 includes a peak data point 40 characterized as greater than an individual threshold 42A, which is located in range bin #27. That is, one of the receive channels in the controller received one of the antenna signals 30 that indicated the peak data point 40 which did not correspond or coincide with the peak composite point 38. Since the peak data point 40 does not correspond to (i.e. is not in the same range bin) the peak composite point 38, there is an indication that more than one object is present in the field-of-view 22. In other words, if the peak composite point 38 and the peak data point 40 indicate objects or targets at two different ranges (e.g. r1 and r2 in FIG. 1), then the peak composite point 38 and the peak data point 40 do not correspond, so more than one object is indicated. That is, the peak data point 40 is indicative of a range r1 to a first object 24A that is not indicated by the composite data set 34, while the peak composite point 38 is indicative of a range r2 to a second object 24B that is indicated by the composite date set 34.

While this example used a different value (56 dB) for the individual threshold 42A as compared to 49 dB for the composite threshold 36, it is contemplated that different values may be used, and those values may be best determined by empirical testing.

FIG. 3 illustrates a non-limiting example of a graph 300 that illustrates the reflected signal profiles 32 and the composite data set 34 when two objects (e.g. the first object 24A and the second object 24B) are present in the field-of-view 22. In this example, more than one object is indicated if any of the reflected signal profiles 32 includes an intermediate data point 48 characterized as less than and between a first data point 44 and a second data point 46, and both the first data point 44 and the second data point 46 are greater than the individual threshold 42B. Since both the first data point 44 and the second data point 46 are greater than the individual threshold 42B, there is a high degree of confidence that each data point (the first data point 44 and the second data point 46) corresponds to a distinct object or target.

Further confidence is evident since the composite data set 34 has corresponding data points greater than the composite threshold 36. That is, the first data point 44 is in the same range bin as (i.e. corresponds to) a composite data point in the composite data set 34 that is greater than the composite threshold 36. While, the second data point 46 is in the same range bin as (i.e. corresponds to) a peak composite point 38 in the composite data set 34 that is greater than the composite threshold 36, this is not a requirement. That is, a situation may arise where both the first data point 44 and the second data point 46 do not coincide with or correspond to the peak composite point 38. For example, the second data point 46 may be in Range bin #29. In general, an accurate bin position estimation of the targets can be obtained by applying various post-processing techniques such as adjacent-data-points interpolation.

Figure 4:
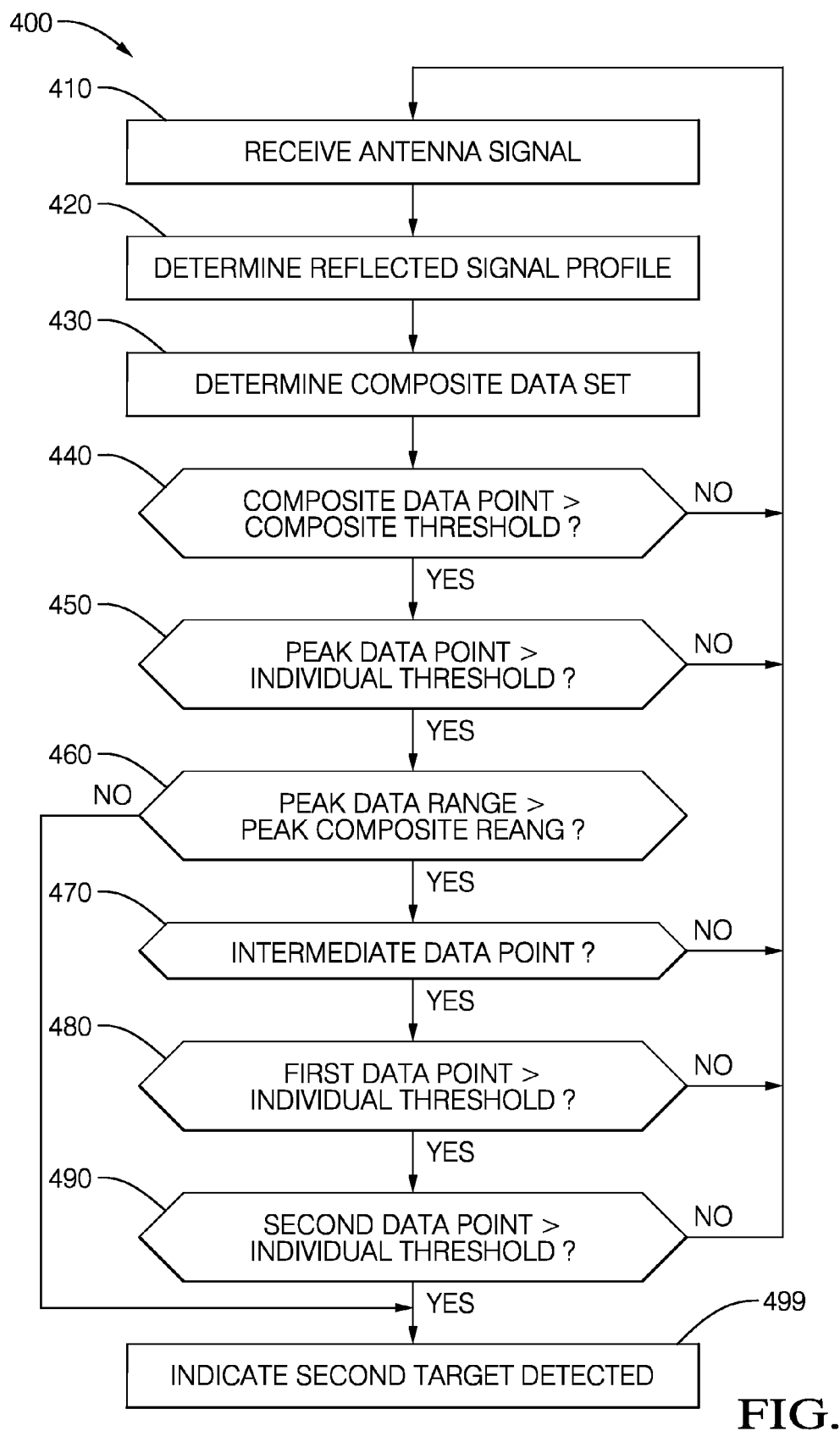
FIG. 4 is a flowchart of a method executed by the system of FIG. 1 in accordance with one embodiment.

FIG. 4 illustrates a non-limiting example of a method 400 of operating radar system (the system 10). While FIG. 4 illustrates a particular order of steps, it is recognized that the order of these steps could be rearranged, and/or that additional steps may be introduced, while still being able to detect or determine that more than one object is present in the field-of-view 22.

Step 410, RECEIVE ANTENNA SIGNAL, may include the controller 26 (FIG. 1) receiving an antenna signal (e.g. the antenna signals 30) from each of a plurality of antennas 16 corresponding to a reflected radar signal 20 detected by each antenna (e.g. the first antenna 16A and the second antenna 16B).

Step 420, DETERMINE REFLECTED SIGNAL PROFILE, may include determining a reflected signal profiles 32 (FIGS. 2 and 3) of each of the antenna signals 30. The reflected signal profiles 32 may be based on a Fourier transform of each of the antenna signals 30.

Step 430, DETERMINE COMPOSITE DATA SET, may include determining a composite data set 34 based on a combination of the reflected signal profiles 32. The composite data set 34 may be determined by way of non-coherent integration, or other algorithms known to those in the art.

Step 440, COMPOSITE DATA POINT>COMPOSITE THRESHOLD?, may include determining if the composite data set 34 includes a composite data point that is characterized as greater than a composite threshold 36. By way of example and not limitation, the composite date set 34 may be represented in terms of the amplitude or magnitude of reflected radar signal 20 for a particular distance. As illustrated in FIGS. 2 and 3, the distance may be organized or segmented into predetermined range bins.

Steps 450 to 499 are general directed to the step MORE THAN ONE OBJECT?, which is generally summarized determining if any of the reflected signal profiles 32 indicate that the emitted radar signal 18 is reflected by more than one object (e.g. the first object 24A and the second object 24B). In order to conserve data processing throughput of the controller 26, the method 400 may only perform the step of determining if any of the reflected signal profiles 32 indicate that the emitted radar signal 18 is reflected by more than one object if the controller 26 determines that the composite data set 34 includes a composite data point greater than the composite threshold 36.

Step 450, PEAK DATA POINT>INDIVIDUAL THRESHOLD?, may include wherein more than one object is indicated if any of the reflected signal profiles 32 includes a peak data point 40 characterized as greater than an individual threshold 42A and that does not correspond to the peak composite point 38. If NO, then the method 400 may return to step 410 to acquire a new reading of the antenna signals 30.

Step 460, PEAK DATA RANGE=PEAK COMPOSITE RANGE?, may include detecting an instance where the peak data point 40 of one of the reflected signal profiles 32 is indicative of a range to an object that is not indicated by the composite data set. That is, the controller 26 may search all of the reflected signal profiles to determine if any of the reflected signal profiles 32 includes a peak such as the peak data point 40 which does not coincide with or does not correspond to the peak composite point 38. If NO, the method 400 may have detected a second object, and so may proceed to step 499.

Accordingly, a radar system (the system 10), a controller 26 for the system 10 and a method 400 of operating the system 10 is provided. These all include an improved way to determine if more than one target is present in the field-of-view 22 where prior attempts may have detected only one target.

While this invention has been described in terms of the preferred embodiments thereof, it is not intended to be so limited, but rather only to the extent set forth in the claims that follow.

We claim:

1. A radar system comprising:
a plurality of antennas, wherein each antenna is configured to detect a reflected radar signal reflected by an object in a field-of-view of the system; and
a controller configured to
receive an antenna signal from each antenna corresponding to the reflected radar signal detected by the antenna,
determine a reflected signal profile of each antenna signal,
determine a composite data set based on a combination of the reflected signal profiles,
determine if the composite data set includes a composite data point characterized as greater than a composite threshold, and
determine if any of the reflected signal profiles indicate that the radar signal is reflected by more than one object.

2. The system in accordance with claim 1, wherein the controller is configure to determine if any of the reflected signal profiles indicate that the radar signal is reflected by more than one object only if the controller determines that the composite data set includes a composite data point greater than the composite threshold.

3. The system in accordance with claim 1, wherein the composite data set is determined by way of non-coherent integration.

4. The system in accordance with claim 1, wherein if the composite data set defines a peak composite point characterized as greater than the composite threshold, then more than one object is indicated if any of the reflected signal profiles includes a peak data point characterized as greater than an individual threshold, and that does not correspond to the peak composite point.

5. The system in accordance with claim 4, wherein the peak data point is indicative of a range to an object that is not indicated by the composite data set.

6. The system in accordance with claim 1, wherein more than one object is indicated if any of the reflected signal profiles includes an intermediate data point characterized as less than and between a first data point and a second data point, and both the first data point and the second data point are greater than an individual threshold.

7. A method of operating radar system comprising:
receiving an antenna signal from each of a plurality of antennas corresponding to a reflected radar signal detected by each antenna;
determining a reflected signal profile of each antenna signal;
determining a composite data set based on a combination of the reflected signal profiles;
determining if the composite data set includes a composite data point characterized as greater than a composite threshold; and
determining if any of the reflected signal profiles indicate that the radar signal is reflected by more than one object.

8. The method in accordance with claim 7, wherein the step of determining if any of the reflected signal profiles indicate that the radar signal is reflected by more than one object is performed only if the controller determines that the composite data set includes a composite data point greater than the composite threshold.

9. The method in accordance with claim 7, wherein the composite data set is determined by way of non-coherent integration.

10. The method in accordance with claim 7, wherein more than one object is indicated if any of the reflected signal profiles includes a peak data point characterized as greater than an individual threshold and that does not correspond to the peak composite point.

11. The method in accordance with claim 10, wherein the peak data point is indicative of a range to an object that is not indicated by the composite data set.

12. The method in accordance with claim 7, wherein more than one object is indicated if any of the reflected signal profiles includes an intermediate data point characterized as less than and between a first data point and a second data point, and both the first data point and the second data point are greater than an individual threshold.

* * * * *